US010476411B2

United States Patent
Holmes et al.

(10) Patent No.: US 10,476,411 B2
(45) Date of Patent: Nov. 12, 2019

(54) ELECTRIC MACHINE HAVING CONTINUOUSLY-VARIABLE MAGNETIC CHARACTERISTICS AND METHOD OF CONTROLLING THE SAME

(71) Applicant: GM GLOBAL TECHNOLOGY OPERATIONS LLC, Detroit, MI (US)

(72) Inventors: Alan G. Holmes, Clarkston, MI (US); Paul F. Turnbull, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 261 days.

(21) Appl. No.: 15/492,666

(22) Filed: Apr. 20, 2017

(65) Prior Publication Data

US 2018/0309394 A1 Oct. 25, 2018

(51) Int. Cl.
*H02P 3/00* (2006.01)
*H02P 6/08* (2016.01)
*H02K 21/02* (2006.01)
*B60L 15/20* (2006.01)
*B60L 50/50* (2019.01)

(52) U.S. Cl.
CPC .............. *H02P 6/08* (2013.01); *B60L 15/20* (2013.01); *B60L 50/50* (2019.02); *H02K 21/024* (2013.01); *B60L 2240/421* (2013.01); *B60L 2240/423* (2013.01); *Y02T 10/7258* (2013.01)

(58) Field of Classification Search
CPC ..... H02P 6/08; H02K 1/2786; B60L 11/1879; B60L 11/1807; B60L 11/18

USPC .......................................................... 318/452
See application file for complete search history.

(56) References Cited

U.S. PATENT DOCUMENTS

| | | | |
|---|---|---|---|
| 9,022,002 B2* | 5/2015 | Schwenke | F02N 15/00 123/179.3 |
| 9,624,847 B2* | 4/2017 | Kim | B60W 20/11 |
| 9,647,519 B2* | 5/2017 | Turnbull | H02K 15/16 |
| 2007/0241628 A1* | 10/2007 | Himmelmann | H02K 21/027 310/190 |
| 2015/0014115 A1* | 1/2015 | Holmes | F16D 13/08 192/80 |

* cited by examiner

*Primary Examiner* — Jorge L Carrasquillo
*Assistant Examiner* — Gabriel Agared
(74) *Attorney, Agent, or Firm* — Quinn IP Law

(57) ABSTRACT

An electric machine produces motor torque having continuously variable magnetic and reluctance torque components. The electric machine includes stator and rotor assemblies. Different ends of the rotor hub have different average magnetic field strengths, with the second field strength at one end being weaker than the other. The rotor hub translates along the rotor shaft to vary the magnetic and reluctance torque components at different speed and torque operating points of the electric machine. A vehicle includes the machine, a transmission, a load, and a controller executing a method for controlling the axial position of the rotor hub. The method may include determining the speed and a torque of the electric machine, determining a corresponding desired axial position of a rotor hub, and translating the rotor hub to the desired axial position.

15 Claims, 2 Drawing Sheets

ELECTRIC MACHINE HAVING CONTINUOUSLY-VARIABLE MAGNETIC CHARACTERISTICS AND METHOD OF CONTROLLING THE SAME

INTRODUCTION

Electric machines are used to generate torque for use in powering a wide range of electromechanical systems. Such electric machines, for instance electric traction motors and motor/generator units, include a rotor hub and shaft that are concentrically positioned with respect to stator assembly. The interaction of electromagnetic fields of the rotor hub and stator assembly are closely controlled in a manner that results in the fields alternatively attracting and repelling one another, thereby resulting in rotation of the rotor shaft. The rotation of the rotor shaft may be harnessed for use in power generation, propulsion systems, and other beneficial uses.

In a permanent magnet-type electric machine, rare earth magnets are surface-mounted to or embedded within laminations of the rotor hub. The stator assembly includes a stator core defining multiple stator slots. The stator slots are individually wound with lengths of electrical wire forming the stator windings, with each of the stator windings corresponding to different electrical phases in a polyphase configuration. When the stator windings are sequentially energized, the end effect is the generation of a rotating electromagnetic field. The rotating electromagnetic field then interacts in a push-pull manner with the permanent magnetic field of the rotor hub, with the resultant forces rotating the rotor shaft.

SUMMARY

A permanent magnet-type electric machine is disclosed herein. Due to its construction, the electric machine has continuously-variable magnetic reluctance characteristics that are selected in response to the current rotational speed and torque of the electric machine. Relative to internal combustion engines, operation of an electric machine is energy efficient during low-speed/high-torque operating conditions, such as when motor torque is used to quickly accelerate a vehicle from a standstill. However, as the motor speed increases and motor torque decreases, the efficiency advantages provided by the electric machine tend to decrease. A solution to this phenomenon may be found in the disclosed electric machine, which specifically addresses the high-speed/low-torque performance issues noted above without compromising the structural integrity and packaging requirements of the electric machine.

The electric machine according to an example embodiment includes separate stator and rotor assemblies, the latter having a cylindrical rotor hub and a connected rotor shaft. The rotor hub, which circumscribes the rotor shaft, may be splined or otherwise connected to the rotor shaft in a manner sufficient for permitting both translation of the rotor hub along an axial length of the rotor shaft and common rotation of the rotor hub and rotor shaft. The selective translation of the rotor hub occurs along an axial length of the rotor shaft in order to continuously vary the magnetic characteristics, i.e., relative magnetic and reluctance contributions to the total torque of the electric machine, anywhere inclusive of and between calibrated maximum and minimum levels.

The rotor hub as described herein may be positioned a calibrated distance away from the stator assembly and configured with calibrated, constant magnetic reluctance characteristics. The rotor hub includes first and second ends having different magnetic field strengths, i.e., a weak field end and strong field end. Such a field strength disparity may be constructed in various ways, such as by varying the size, strength, type, grade, number, and/or placement of a set of rare earth permanent magnets along an axial length of the rotor hub. Alternatively, the rotor hub may be constructed as a mechanically uniform structure having variable levels of magnetization, e.g., by magnetizing the first and second ends at different levels of magnetic field strength without necessarily attaching or embedding different permanent magnets. The rotor hub may have constant magnetic reluctance characteristics along an axial length of the rotor hub. The rotor hub may have different magnetic reluctance characteristics along an axial length of the rotor hub, such as an increased reluctance ratio at the weak field end of the rotor hub.

The position of the rotor hub along the axial length of the rotor shaft may be automatically and continuously varied during operation of the electric machine anywhere between and inclusive of designated first and second axial positions on the rotor shaft. This allows the continuous variation of a magnetic torque contribution to the total output torque of the electric machine, and by default, a continuous variation of a magnetic torque. For instance, when the rotor hub translates or slides along the rotor shaft to a first axial position, the motor output torque may be constituted of about 25% reluctance torque with the remaining 75% being magnetic torque. The magnetic torque contribution to total motor torque of the electric machine may decrease to a lower level, such as 50% magnetic torque, with the reluctance torque contribution thus rising to 50% in that particular example mix, with this change of relative torque contribution occurring when the rotor hub is translated to a second axial position along the rotor shaft.

Certain embodiments of the present disclosure may include an actuator that is configured to apply an actuation force to the rotor hub at a level sufficient for translating the rotor hub along the rotor shaft. In other embodiments, self-actuation of the rotor hub may be realized via the controlled introduction of a flux-weakening electrical current to phase windings of the stator assembly, with the resultant field changes caused by introduction of the stator current serving to attract or repel the rotor hub as needed. A return spring may be used to facilitate the passive actuation and axial return motion of the rotor hub.

An example vehicle includes the electric machine noted above as well as a transmission, controller, and load. The transmission is connected to the load, e.g., a set of road wheels, a propeller, or a drive axle, and is configured to provide an output torque to the load responsive to an input torque. The electric machine is operable for producing the input torque to the transmission, and may be constructed as set forth above. The controller is programmed or otherwise configured to receive input signals, including a measured, calculated, or estimated rotational speed and output torque of the electric machine, and to command translation of the rotor hub along the axial length of the rotor shaft responsive to such input signals. The distance of translation is sufficient to automatically vary the magnetic torque component, and thus the relative magnetic and reluctance torque contributions, in a manner suited to the current speed and torque of the electric machine.

A method is also disclosed herein for controlling the electric machine. The method may include determining a rotational speed and output torque of the electric machine via a controller and one or more sensors, and also determining a desired axial position of a cylindrical rotor hub of the rotor assembly using a lookup table. The desired axial position corresponds to the received motor speed and torque. The method also includes translating the rotor hub along the axial length of a rotor shaft of the rotor assembly to the determined desired axial position, such that the relative magnetic and reluctance torque contributions are continuously varied in real-time responsive to the determined speed and torque.

The above-noted and other features and advantages of the present disclosure will be readily apparent from the following detailed description of the embodiments and best modes for carrying out the disclosure when taken in connection with the accompanying drawings and appended claims.

DETAILED DESCRIPTION

Figure 1:
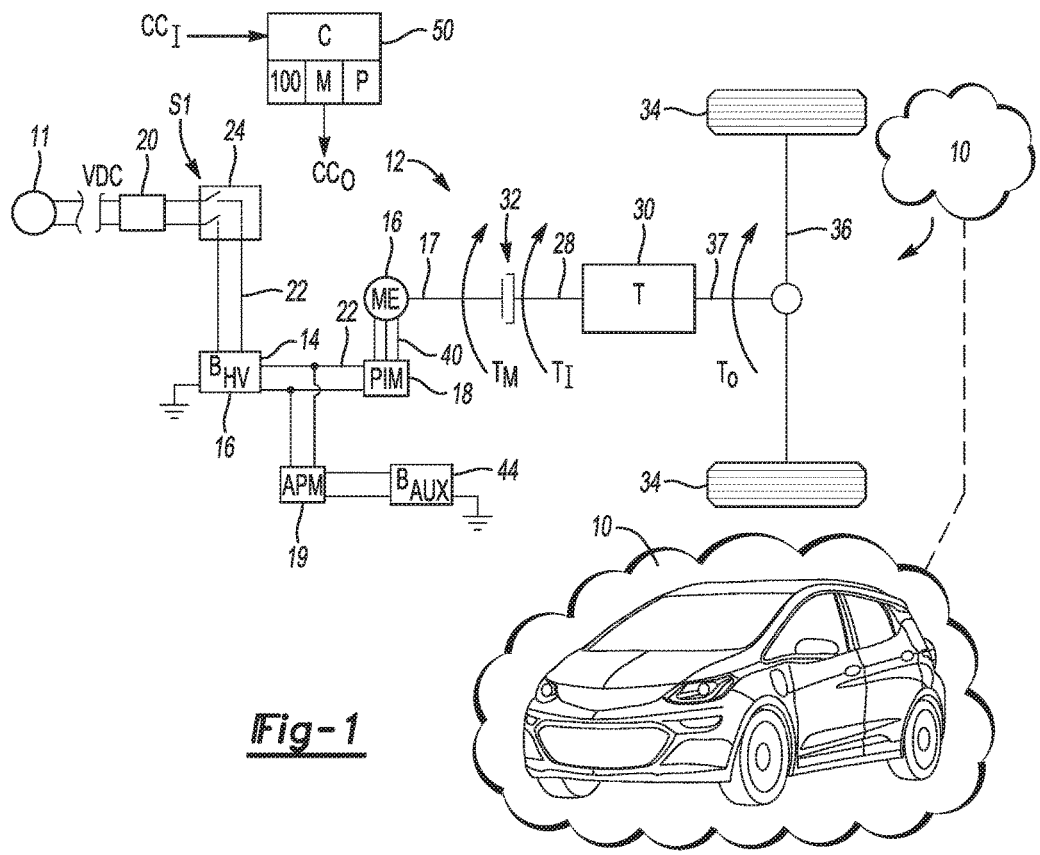
FIG. 1 is a schematic top view illustration of an example vehicle having a permanent magnet-type electric machine having a translatable rotor hub providing continuously-variable magnetic characteristics.

Referring to the drawings, wherein like reference numbers refer to like components, FIG. 1 depicts an example vehicle 10 having an electric powertrain 12. In turn, the electric powertrain 12 includes a high-voltage battery pack ($B_{HV}$) 14 that is electrically connected to a permanent magnetic-type electric machine ($M_E$) 16. The electric machine 16 may be used as a traction motor aboard the vehicle 10 to generate motor torque (arrow $T_M$) at a level sufficient for propelling the vehicle 10, as an electrical generator, and/or for performing other useful work aboard the vehicle 10.

Beneficial applications of the electric machine 16 are not limited to mobile or vehicular applications in general, or to motor vehicle propulsion applications in particular. Those of ordinary skill in the art will appreciate that the attendant benefits of the disclosed electric machine 16 when constructed as described below with reference to FIGS. 2 and 3 may be extended to stationary and mobile applications that rely on the use of motor torque (arrow $T_M$) under high-speed/low-torque operating conditions of the electric machine 16. The electric machine 16 may be actively controlled according to the example embodiment of FIG. 2 or passively regulated according to the example embodiment of FIG. 3. An example control method 100 may be used with either the active or the passive embodiment, with an example of the method 100 depicted in FIG. 4.

With respect to the example vehicle 10 of FIG. 1, the battery 14 may be recharged via an offboard charging station 11, for instance a DC fast-charging station as shown, with the charge possibly delivered directly to the battery pack 14 using an applied DC voltage (VDC) via a charge coupling device 20, to a DC voltage bus 22 via a voltage regulator 24 having internal semiconductor and/or mechanical switches 51, or via an available alternating current charging system (not shown).

When the electric machine 16 is embodied as a polyphase device as shown, the electric powertrain 12 may include a power inverter module (PIM) 18 that is electrically connected to the battery pack 14 via the DC voltage bus 22. Internal semiconductor switches (not shown) of the PIM 18 are automatically controlled via pulse width modulation or other desired switching techniques in order to generate an AC output voltage suitable for energizing the electric machine 16. An AC voltage bus 40 is used to electrically connect the PIM 18 to the individual phase windings of the electric machine 16. A DC-DC voltage converter/auxiliary power module (APM) 19 may be used to reduce a voltage level of the DC voltage bus 22 to a lower auxiliary level, e.g., 12-15 VDC, which in turn may be stored in an auxiliary battery pack ($B_{AUX}$) 44 for use in energizing low-voltage electrical systems aboard the vehicle 10.

A rotor shaft 17 of the electric machine 16 may be selectively connected to a load, e.g., an input member 28 of a transmission (T) 30, via operation of a clutch 32. The rotor shaft 17 rotates so as to deliver an input torque (arrow $T_I$) to the input member 28 of the transmission 30 whenever the electric machine 16 is operated as an electric traction motor, and/or the electric machine 16 may be operated as a generator as needed. For instance, motor torque (arrow $T_M$) from the energized electric machine 16 may be directed to the input member 28 and/or to another load in the form of an output member 37 of the transmission 30 and a set of drive wheels 34 connected to the output member 37 depending on the configuration of the electric powertrain 12. Output torque (arrow $T_O$) from the transmission 30 may be transmitted to the drive wheels 34 via one or more drive axles 36. Powerflow direction may be reversed during a regenerative event such as regenerative braking in order to charge the battery pack 14, i.e., with regenerative torque from the rotating electric machine 16 generating electricity that is fed to the battery pack 14 so as to increase or maintain a state of charge thereof.

A controller (C) 50 may be used to control ongoing operation of the electric machine 16 responsive to a set of input signals (arrow $CC_I$), doing so via transmission of a set of control signals (arrow $CC_O$) in the manner set forth below with reference to FIG. 4. The controller 50 may be embodied as one or more electronic control units having the requisite memory (M) and a processor (P), as well as other associated hardware and software, e.g., a clock or timer, input/output circuitry, etc. Memory (M) may include sufficient amounts of read only memory, for instance magnetic or optical memory. Instructions embodying the method 100 may be programmed into the memory (M) and executed by the processor(s) (P) during operation of the vehicle 10 so as to optimize efficiency of the electric machine 16.

The structure of the electric machine 16 will now be described with reference to FIGS. 2 and 3. Both Figures are described in the context of acting on and changing an axial position of a cylindrical rotor hub 33R with respect to a stator assembly 26 as indicated by double-headed arrow AA in FIG. 2. However, the relative axial position of the rotor hub 33R and stator assembly 26 determines the nature of the electromagnetic field interaction. Therefore, although omitted from FIGS. 2 and 3 for illustrative simplicity, alternative embodiments may be realized in view of the present disclosure in which the axial position of the rotor hub 33R remains fixed and that of the stator assembly 26 changes during operation. For instance, an embodiment may include connecting the stator assembly 26 to a stationary member 75 as shown in FIG. 3 via a similar splined connection and having an actuator 60 as shown in FIG. 2 act on a stator core 26C instead of the rotor hub 33R.

Figure 2:
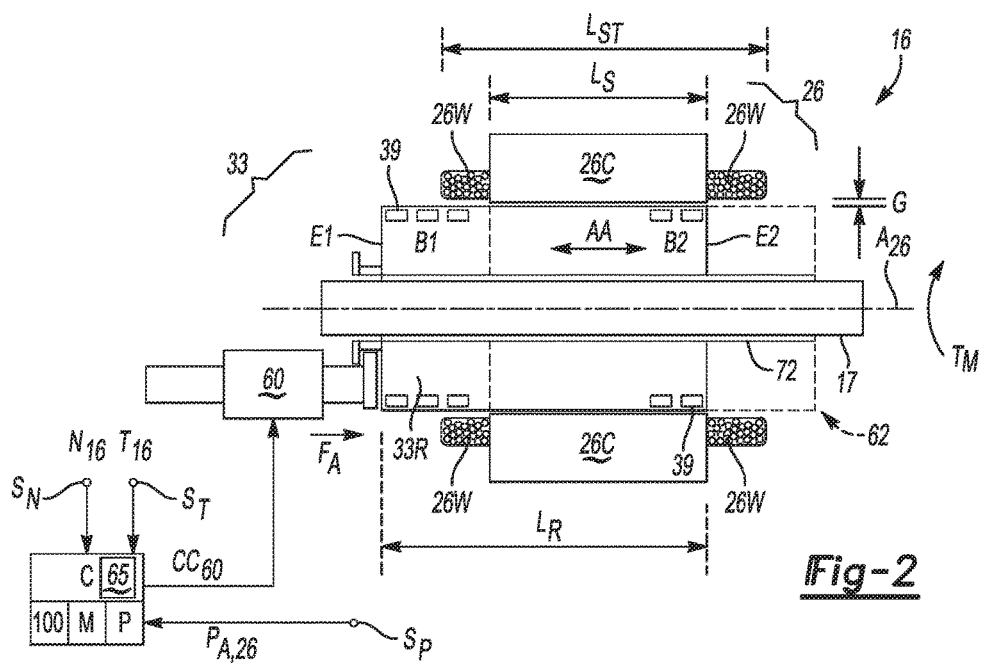
FIG. 2 is a schematic side view illustration of the electric machine of FIG. 1.
Figure 3:
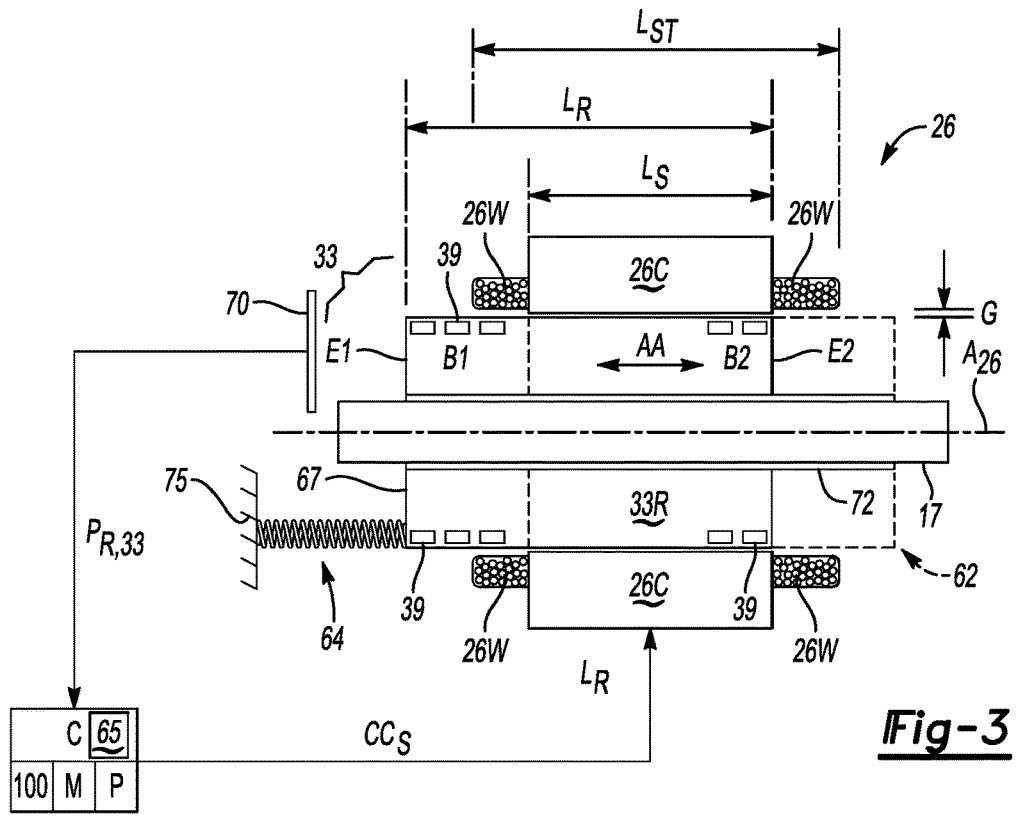
FIG. 3 is a schematic side view illustration of the electric machine of FIG. 2 according to an alternative embodiment.

With respect to FIG. 2, the electric machine 16 includes the stator assembly 26 and a rotor assembly 33 having respective axial lengths $L_S$ and $L_R$. The stator assembly 26 includes a stator core 26C and stator windings 26W, with the stator windings 26W wound within stator slots (not shown) of the stator core 26C to form an electromagnet. Thus, the stator assembly 26 has a total axial length $L_{ST}$ inclusive of the stator windings 26W. The rotor assembly 33 includes the rotor hub 33R which is connected to the rotor shaft 17, with the rotor shaft 17 having an axis of rotation $A_{26}$.

The total amount of motor torque (arrow $T_M$), i.e., the "total motor torque" noted elsewhere herein, includes separate electromagnetic and reluctance torque components whose relative contribution to the total motor torque is continuously variable. The term "electromagnetic torque" describes an amount of torque generated by the resultant push-pull forces due to interacting time-varying electromagnetic fields of the stator assembly 26 and the rotor assembly 33 within the example electric machine 16 of FIG. 2. The term "reluctance" is analogous to electrical resistance, with magnetic flux following a path of least magnetic reluctance in a manner that is conceptually similar to how an electrical current will follow a path of least electrical resistance. Thus, the term "reluctance torque" describes the time-varying torque contribution of the rotor hub 33R as the rotor hub 33R shifts to align a minimum reluctance flux path with a rotating stator field, in this instance the stator field produced by stator core 26C.

In general, the electric machine 16 produces torque from both the magnetic field of the rotor assembly 33 and the rotational reluctance ratio of the rotor assembly 33 at a given axial position. If the electric machine 16 is rotated relative to the stator field from the stator core 26C, the reluctance through the rotor assembly 33 changes. The term "reluctance ratio" is the ratio of maximum-to-minimum reluctance through the rotor assembly 33 as the rotor hub 33R is rotated at a given axial position. As the rotor magnetic field rotates, drag and a counter-voltage ("back EMF") are produced that resist a passage of current through stator windings 26W. The reluctance ratio does not produce drag or counter-voltage. So, the ideal situation at high speeds when low torque is required is to reduce the magnetic field while maintaining or increasing the reluctance ratio. The present configuration enables this desirable result to occur.

In FIG. 2, the cylindrical rotor hub 33R has respective first and second ends E1 and E2 each magnetized with different average magnetic fields B1 and B2 with corresponding field strengths. The first end E1 may have an average magnetic field strength that is weaker than the average magnetic field at the second end E2, or vice versa. Thus, the magnetic field strength of the cylindrical rotor hub 33R varies along its axial length $L_R$ with strong, constant reluctance characteristics. This feature enables the electromagnetic and reluctance torque contributions to the motor torque (arrow $T_M$) to be automatically varied between predetermined relative contribution levels or percentages, with the variation occurring actively or passively in response to different speed and torque operating points of the electric machine 16.

For example, the operation of the electric machine 16 may include a low-speed/high-torque operating point at which the magnetic torque component of the motor torque (arrow $T_M$) is high, e.g., about 75 percent, and the reluctance torque component is low, or about 25 percent in keeping with this example. Another high-speed/low-torque operating point may be used at which the desired magnetic and reluctance torque components are approximately equal, such as about 50 percent each. Other magnetic and reluctance torque component contribution levels may be used in other embodiments depending on the application of the electric machine. Between the desired contribution levels, i.e., at a first position as shown and a second position demarcated by boundary 62, the rotor hub 33R may be translated along the rotor shaft 17 as indicated by double-headed arrow AA to provide continuously-variable magnetic/reluctance contributions.

The rotor hub 33R may be splined or otherwise slidably connected to the rotor shaft 17, with a spline 72 shown in FIG. 2, and thus is translatable along the rotor shaft 17. The axial length $L_R$ of the rotor hub 33R may exceed the axial length $L_S$ of the stator core 26C, e.g., by 150 percent in an example embodiment. The axial length $L_R$ of the rotor hub 33R may be equal to the total axial length $L_{ST}$ of the stator assembly 26 in some embodiments. The stator core 26C is separated from the rotor hub by the radial air gap G that, in some embodiments, may be uniform along the axial length $L_S$ of the stator core 26C as shown. In other embodiments, the radial air gap G may gradually taper such that the air gap G is smaller at the second end E2 than it is at the first end E1.

Various approaches may be taken to providing the different magnetic field strengths along the axial length of the rotor hub 33R. For example, the rotor assembly 33 may include a plurality of permanent magnets 39 connected to or embedded within the rotor hub 33R, e.g., within slots (not shown) thereof. The arrangement of such slots creates a preferential pathway for generated magnetic flux at different rotational positons of the rotor hub 33R. A number of the permanent magnets 39 positioned at the first end E1 may exceed a number of the permanent magnets 39 positioned at the second end E2.

Alternatively, the number of permanent magnets 39 may be the same at the first and second ends E1 and E2, with the magnetic field strength provided by the permanent magnets 39 at the first end E1 exceeding the magnetic strength of the permanent magnets 39 used at the second end E2. Likewise, placement of such permanent magnets 39 may be varied so as to produce the desired magnetic field variation between the first and second ends E1 and E2, or magnets 39 may be omitted altogether in favor of a mechanically uniform rotor hub 33R along the axial length $L_R$ of the rotor hub 33R, i.e., with varied levels of magnetization of the laminations used to construct the rotor hub 33R instead of placement of permanent magnets 39.

The embodiment of FIG. 2 achieves translation of the rotor hub 33R via operation of the actuator 60 positioned close to the first or second ends E1 or E2 of the rotor hub 33R. The rotor hub 33R is actively translated along the rotor shaft 17 via an actuation force (arrow $F_A$) from the actuator 60 in the depicted embodiment. As noted above, axial translation of the rotor hub 33R occurs responsive to different actual speed and torque operating points of the electric machine 16. Therefore, the controller 50 of FIG. 1 may be used in real time to determine precisely when to translate the rotor hub 33R and thereby vary the relative magnetic/reluctance torque contributions to the total motor torque (arrow $T_M$).

In an example embodiment, the controller 50 may receive, as the set of input signals (arrow $CC_I$) of FIG. 1, information indicative of the present operating point of the electric machine 16. For instance, a position sensor $S_P$ may measure and report the present axial position (arrow $P_{A, 26}$) of the rotor hub 33R. Similarly, a speed sensor $S_N$ and a torque sensor ST may measure/estimate and report the respective rotational speed (arrow $N_{16}$) and output torque ($T_{16}$) of the electric machine 16, with the torque sensor ($S_T$) in particular possibly being embodied as estimated or modeled torque logic of the controller 50 rather than a physical sensor. The controller 50 may be programmed with a lookup table 65, with the processor (P) extracting a corresponding desired position for the current speed and torque operating point. Thereafter, the controller 50 may transmit an actuator control signal (arrow $CC_{60}$) as a possible control signal (arrow $CC_O$) of FIG. 1 to the actuator 60 so as to command the actuator 60 to apply the force (arrow $F_A$) and thus axially position the rotor hub 33R to the corresponding desired axial position from the lookup table 65.

FIG. 3 depicts an alternative, passively-regulated embodiment of the electric machine 16 of FIG. 2. In lieu of the actuator 60 of FIG. 2, implementation may be by way of self-actuation through stator field control and a return spring 64 connected between a radial surface 67 of the rotor hub 33R and a stationary member 65, e.g., a motor housing. The passive embodiment operates by virtue of the tendency of a magnetic force to repel the more magnetic end of the rotor hub 33R, in this instance the first end E1. Stator control involves the sequential change in phase currents to the stator windings 26W so as to create a rotating set of vectors in the stator assembly 26. The rotating vectors interact with the magnetic field of the rotor hub 33R and the reluctance of the rotor hub 33R to thereby rotate the rotor hub 33R. Control of the stator current relies on precise knowledge of the rotary position of the rotor hub 33R, which may be measured via a resolver or encoder 70 and reported to the controller 50 as a measured rotary position ($P_{R, 33}$).

In turn, the controller 50 may calculate and output a stator current command to energize the stator windings 26W in a particular manner as to weaken the stator flux, i.e., generating a flux-weakening current command (arrow $CC_S$) as part of the control signals (arrow $CC_O$) of FIG. 1, with the flux-weakening current command (arrow $CC_S$) ultimately introducing flow of a flux-weakening stator current into the stator windings 26W. Therefore, FIG. 3 depicts a possible embodiment in which self-actuation and translation of the rotor hub 33R is realized by virtue of stator field control assisted by the return spring 64.

Figure 4:
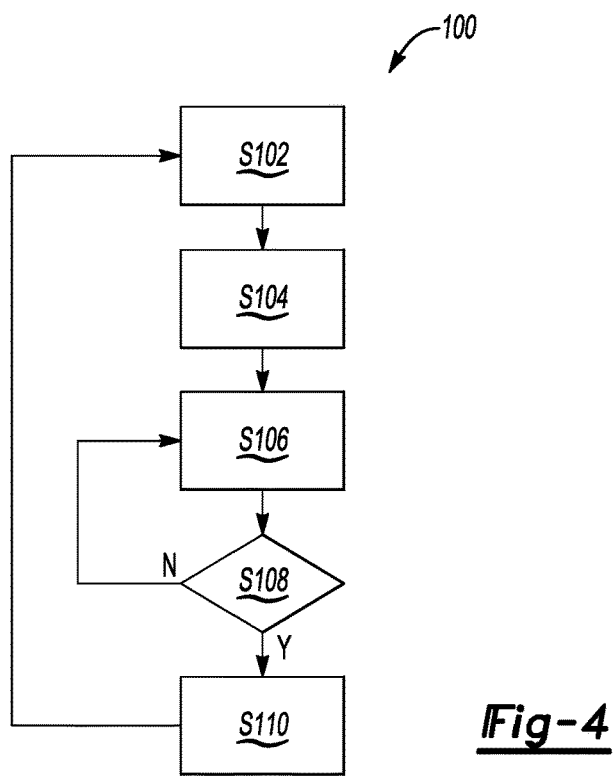
FIG. 4 is a flow chart describing an example method for controlling an axial position of a rotor hub of the electric machine shown in FIGS. 1-3 to thereby continuously vary the magnetic characteristics of the electric machine.

Referring to FIG. 4, the method 100 may be implemented in logic of the controller 50 and automatically executed during ongoing operation of the electric machine 16. The method 100 may be used with the actively-controlled embodiment of FIG. 2 or the passively regulated embodiment of FIG. 3, with slight variations in approach as noted below.

Beginning with step S102, the controller 50 measures, estimates, or otherwise determines the current rotational speed and torque of the electric machine 16. For instance, the rotational speed of the rotor shaft 17 of FIG. 1 may be measured using a speed sensor $S_N$ as shown schematically in FIG. 2, e.g., a shaft encoder, Hall-effect sensor, or photoelectric sensor. Motor torque (arrow $T_M$ of FIGS. 1-3) may be estimated or calculated based on the measured motor speed and calibrated or measured characteristics of the electric machine 16, such as current and/or voltage. The method 100 then proceeds to step S104.

Step S104 includes extracting a desired axial position of the rotor hub 33R from the lookup table 65 in memory (M) of the controller 50. The desired axial position may be pre-recorded in the lookup table 65 under a corresponding speed and torque as a calibration value. The method 100 proceeds to step S106 when the desired axial position of the rotor hub 33R has been determined.

At step S106, the controller 50 may command the axial translation of the rotor hub 33R to the desired axial position extracted at step S104. The implementation of step S106 may vary depending on the embodiment. For instance, when the active control embodiment of FIG. 2 is used, the controller 50 may command actuation of the actuator 60, e.g., by energizing a solenoid thereof to cause linear translation of a plunger (not shown) of the actuator 60 and application of the force (arrow $F_A$) to the rotor hub 33R. Thus, step S106 may entail translating the desired position from the lookup table 65 to a corresponding voltage or current command, and thereafter applying the current or voltage to the actuator 60.

For the example passive embodiment of FIG. 3, the control action of step S106 may include introduction of a calibrated stator current to the stator windings 26W of FIG. 3 so as to cause the rotor hub 33R to be magnetically repelled to the desired axial position by virtue of field interaction. In such an embodiment, the current speed and torque of the electric machine 16 may correspond to a calibrated stator current, which is then applied by the controller 50 to cause linear motion or translation of the rotor hub 33R to the desired axial position. The method 100 then proceeds to step S108.

S108 may include determining whether the rotor hub 33R has reached the desired position, e.g., using a position sensor, timer, or the like. Step S106 is repeated in a loop with step S108 until the desired axial position is reached. The method 100 thereafter proceeds to step S110.

Step S110 includes discontinuing position control actions of the controller 50 and proceeding to step S102. The method 100 is thereafter repeated in a loop during operation of the electric machine 16 to continuously vary the desired magnetic characteristics/relative contributions of magnetic and reluctance torque of the electric machine 16 as a function of speed and torque of the electric machine 16.

Using the electric machine 16 of FIG. 1 as constructed according to FIG. 2 or 3 and controlled according to the example method of FIG. 4, greater potential for efficiency gains may be possible over a given motor operating range. This is enabled by the combination of strong, constant reluctance torque characteristics, strong permanent magnet torque at high loads, reduced permanent magnet torque at low loads, and uncompromised stator and rotor pole configurations. The increased length of the rotor hub 33R of FIGS. 2 and 3 and addition of a translatable connection between the rotor hub 33R and to the rotor shaft 17 may increase the complexity of the electric motor 16. However, existing packaging constraints may be retained by limiting the axial length $L_R$ of the rotor hub 33R to fit within, i.e., be less than or equal to, the total length $L_{ST}$ stator assembly 26.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. An electric machine operable for producing a total motor torque having continuously-variable magnetic and reluctance torque components, the electric machine comprising:

a stator assembly having a stator core with an axial length;
   a rotor assembly that includes a rotor shaft and a cylindrical rotor hub each having respective axial lengths, the cylindrical rotor hub having a first end with a first magnetic field strength and a second end with a second magnetic field strength, wherein the second magnetic field strength is weaker than the first magnetic field strength; and a return spring attached to the rotor hub;

wherein the rotor hub is translatable with respect to the rotor shaft, the axial length of the rotor hub exceeds the axial length of the stator core, and the rotor hub is configured to translate in a first direction along the axial length of the rotor shaft, via an apply force from an actuator or via introduction of a flux-weakening stator current to the stator windings, to continuously vary a relative contribution of the magnetic and reluctance torque components to the total motor torque in response to different speed and torque operating points of the electric machine, and to translate in a second direction via operation of the return spring.

2. The electric machine of claim 1, wherein the axial length of the rotor hub is at least 150 percent of the axial length of the stator core.

3. The electric machine of claim 2, wherein the stator hub is wound with stator windings such that the stator assembly has a total axial length equal to or exceeding the axial length of the rotor hub.

4. The electric machine of claim 1, wherein the stator core is separated from the rotor hub by a radial air gap that is uniform along the axial length of the stator core.

5. The electric machine of claim 1, wherein the rotor hub includes a plurality of permanent magnets connected to or embedded within the rotor hub.

6. The electric machine of claim 5, wherein a number of the permanent magnets at the first end exceeds a number of the permanent magnets at the second end.

7. The electric machine of claim 1, wherein the rotor hub is mechanically uniform along the axial length of the rotor hub.

8. The electric machine of claim 1, wherein the torque operating points include a low-speed/high-torque operating point at which the magnetic torque component is about 75 percent and the reluctance torque component is about 25 percent, and a high-speed/low-torque operating point at which each of the magnetic torque component and the reluctance torque component is about 50 percent.

9. A vehicle comprising:

a load;

a transmission connected to the load, and configured to provide an output torque to the load responsive to an input torque;

an electric machine operable for producing the input torque to the transmission, the input torque being a total motor torque having continuously-variable magnetic and reluctance torque components, the electric machine including:

a stator assembly having a stator core with an axial length;

a return spring attached to the rotor hub; and a rotor assembly including a rotor shaft and a cylindrical rotor hub each having a respective axial length, the cylindrical rotor hub having a first end with a first magnetic field strength and a second end with a second magnetic field strength, wherein the second magnetic field strength is weaker than the first average magnetic field strength;

wherein the rotor hub is splined to the rotor shaft, the axial length of the rotor hub exceeds the axial length of the stator core, and the rotor hub is configured to translate along the axial length of the rotor shaft, via an apply force from an actuator or via introduction of a flux-weakening stator current to the stator windings, at different speed and torque operating points of the electric machine, and to translate in a second direction via operation of the return spring; and a controller configured to receive a set of input signals, including a speed and a torque of the electric machine, and to command a translation of the rotor hub along the axial length of the rotor shaft responsive to the set of input signals to thereby continuously vary a relative contribution of the magnetic and reluctance torque component to the total motor torque.

10. The vehicle of claim 9, wherein the axial length of the rotor hub is at least 150 percent of the axial length of the stator core.

11. The vehicle of claim 9, wherein the rotor hub includes a plurality of permanent magnets connected to or embedded within the rotor hub.

12. The vehicle of claim 9, wherein the rotor hub is mechanically uniform along the axial length of the rotor hub.

13. The vehicle of claim 9, wherein the controller is configured to energize the actuator to thereby actively translate the rotor hub along the axial length of the rotor shaft.

14. A method for controlling an electric machine operable for producing a total motor torque that includes continuously-variable magnetic and reluctance torque components, the electric machine having a stator assembly and a rotor assembly, the method comprising:

determining a speed and a torque of the electric machine via a controller and at least one sensor;

determining a desired axial position of a cylindrical rotor hub of the rotor assembly via the controller using a lookup table, the desired axial position corresponding to the received speed and torque, wherein the cylindrical rotor hub has a first end with a first magnetic field strength and a second end with a second magnetic field strength, wherein the second magnetic field strength is weaker than the first magnetic field strength; and translating the rotor hub in a first direction along the axial length of a rotor shaft of the rotor assembly to the determined desired axial position such that a relative of the magnetic and reluctance torque components to the total motor torque is continuously varied in real time responsive to the determined speed and torque, including energizing an actuator connected to the rotor hub or introducing a flux-weakening stator current into stator windings of the stator assembly; and translating rotor hub in a second direction via operation of a return spring connected to the rotor hub.

15. The method of claim 14, wherein translating the rotor hub along the axial length of the rotor shaft of the rotor assembly and to the desired axial position to thereby automatically vary the magnetic and reluctance torque components includes varying the magnetic torque component between about 75 percent and 50 percent at a low-speed/high-torque operating point of the electric machine, and varying the reluctance torque component between about 25 percent and 50 percent at a high-speed/low-torque operating point of the electric machine.

* * * * *